Feb. 23, 1937.  R. H. WICK  2,071,478
HOSE COUPLING
Filed July 11, 1936

INVENTOR.
Ross H. Wick
BY Edward Thomas
his ATTORNEY.

Patented Feb. 23, 1937

2,071,478

UNITED STATES PATENT OFFICE 2,071,478

HOSE COUPLING

Ross H. Wick, Woodhaven, N. Y.

Application July 11, 1936, Serial No. 90,053

5 Claims. (Cl. 285—84)

This invention relates to hose couplings and is herein disclosed in some detail as embodied in one member of an air hose coupling suitable for use at so-called filling stations.

Hose couplings for any kind of rubber hose, or similar hose, involve many difficulties. The hose material is yielding, easily cut, and often slippery, while the coupling elements must ordinarily be made of metal which is relatively hard and unyielding and usually are provided with sharp edges to grip securely the slippery hose. While the invention is described as a hose coupling it is useful for holding nozzles to hose as well as for coupling lengths of hose together.

According to the present invention a tube with an expansible end is inserted in the open end of the hose, usually after a metal ferrule or collar has been placed on the periphery of the hose to keep it from expanding.

A hollow wedge or thrust member is then screwed down within the expansible tube to expand it and grip the hose between the tube and collar.

In the form shown the thrust member carries a thread near its head which turns on an internal thread on the expansible tube so as to thrust apart the sides of the expansible end of the tube and cause it to firmly bind the hose between the tube and the ferrule.

In the form shown, which as stated above is for an air hose, a central passage in the thrust member provides an adequate opening for flow of the air coming through the hose, and the head of the thrust member is shown as slotted to receive a screw driver blade for turning it, thus providing an exceedingly simple structure.

Other features and advantages will hereinafter appear.

In the accompanying drawing.

Figure 1:
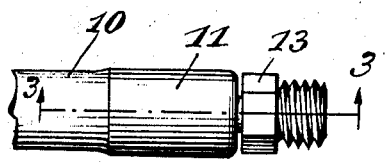
Figure 1 is a side view of a hose end with a coupling inserted.
Figure 2:
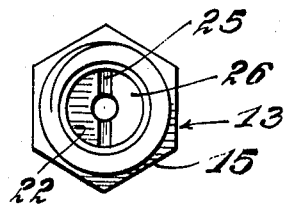
Figure 2 is an enlarged end view of the same.
Figure 3:
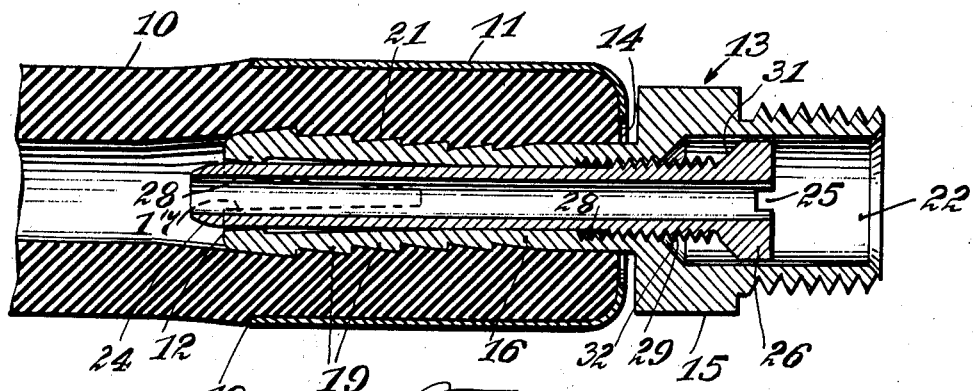
Figure 3 is a section on line 3—3 of Figure 1.
Figure 4:
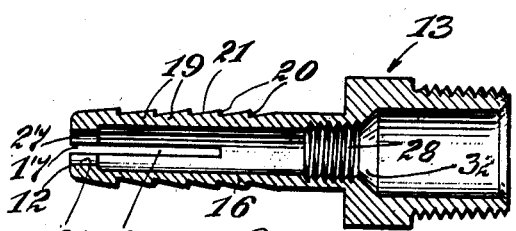
Figure 4 is a sectional view of the expansible member.
Figure 5:
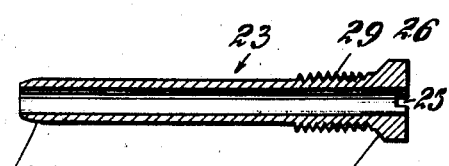
Figure 5 is a sectional view of the thrust member.
Figure 6:
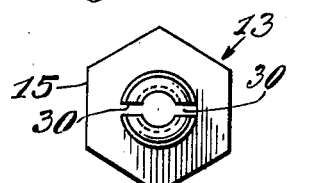
Figure 6 is an end view of Figure 4 looking from the left.

The end of a rubber hose 10 is shown as surrounded by a close fitting collar or brass ferrule 11.

The end 12 of a relatively soft metal expansible member 13 such as brass, is then pushed into the open end 14 of the hose until a collar 15, shown as a hexagon member, lies against the end 14, with the smooth barrel 16 within the hose and also with its slotted end 17 projecting further within the hose, preferably well beyond the edge 18 of the ferrule 11.

In the form shown the member 13 carries the male threads of a hose coupling, and, near the end 17 within the hose 10 carries a series of collars 19 turned or otherwise formed upon it.

The collars are shown with vertical faces 20 facing the end of the hose 10 and with opposite slanting faces 21, thus giving the collars 19 great resistance to pulling out.

After the member 13 is pushed home to the position described, the internal end 17 is expanded. For this purpose, the user thrusts within the opening 22 of member 13 a thrust member 23, shown as having a lengthwise hollow or passage and with a tapering end 24, and then screws the thrust member 23 home by turning it with a screwdriver blade fitted into its end slot 25 in its head 26.

As the screwdriver turns it carries the tapering end 24, further down causing it to pry apart the slotted end 17, because the ends 27 of the expansible member 13 are thick or are bent inwardly to form internal projections, or carry inward projections 28 which are wedged apart by the tapering end 24 as the screw driver turns the thrust member thread 29 in the thread 28 of the member 13 to force the ends 27 apart. The thread then locks the thrust member in place.

The slots 30 of the member 13 usually extend back well within the ferrule 11 and usually cut some collars 19, thus the ends 27 grip the hose 10 against the ferrule 11 over a length sufficient to firmly hold the hose, although, preferably the edges of the collars 19 are blunt to avoid cutting the hose.

The size of the hollow or passage in the member 23 will vary with the fluid to be carried by the hose.

In the form shown, the head 26 of the member 23 is enlarged and abuts at 31 against an internal seat or collar 32 within the hexagon collar 13 so the slot 25 is within the hexagon when screwed home. The coupling, if desired, may be removed and used again by closing up the end of the expanding member preparatory to inserting it in another hose.

Having thus described one embodiment of the invention in some detail, what is claimed is:

1. In a hose coupling, an expansible member having a slotted end, a thrust member adapted to expand the slotted end, and a screw thread on the expansible member on which the thrust member turns to expand the slotted end.

2. In a hose coupling an expansible member adapted to fit within the hose and having a slotted end, internal projections on the end, a thrust member having a central passage and adapted to strike the projections to expand the slotted end against the hose, and means holding the thrust member in position.

3. In a hose coupling an expansible member adapted to fit within the hose and having a slotted end, internal projections on the end, a thrust member having a central passage, a tapered end on the thrust member to strike the projections to expand the end at the slots, and threads on the expansible member on which the thrust member turns to cause it to expand the end.

4. In a hose coupling an expansible member adapted to fit within the hose and having a slotted end, a ferrule outside the hose, internal projections on the slotted end, outside collars adjacent the slotted end, a thrust member having a central passage and a tapered end to strike the projections, and threads on the expansible member on which the thrust member turns to cause the slotted end to expand.

5. In a hose coupling an expansible member adapted to fit within the hose, an abutment on the member adapted to fit against the end of the hose, collars surrounding the end of the member and intersected by slots in the member, a thrust member having a tapered end, a thread on the abutment, a threaded head on the thrust member adapted to fit the abutment thread, and a ferrule on the hose against which some collars bear and beyond which other collars lie.

ROSS H. WICK.